United States Patent [19]

Kikuchi et al.

[11] Patent Number: 4,993,283
[45] Date of Patent: Feb. 19, 1991

[54] ENGINE CONTROL SYSTEM FOR VEHICLE WITH AUTOMATIC

[75] Inventors: Toshiyuki Kikuchi, Higashihiroshima; Maski Fujii, Hiroshima; Mitsutoshi Abe, Hiroshima; Yuji Matsuno, Hiroshima, all of Japan

[73] Assignee: Mazda Motor Corporation, Hiroshima, Japan

[21] Appl. No.: 480,860

[22] Filed: Feb. 16, 1990

[30] Foreign Application Priority Data

Feb. 17, 1989 [JP] Japan .................................... 1-39128

[51] Int. Cl.$^5$ .............................................. B60K 41/06
[52] U.S. Cl. .................................................... 74/858
[58] Field of Search ........................ 74/858, 866, 856; 364/424.1

[56] References Cited

U.S. PATENT DOCUMENTS

| | | | |
|---|---|---|---|
| 4,266,447 | 5/1981 | Heess et al. | 74/858 |
| 4,355,550 | 10/1982 | Will et al. | 74/872 |
| 4,370,903 | 2/1983 | Stroh et al. | 74/858 |
| 4,370,904 | 2/1983 | Muller et al. | 74/858 |
| 4,403,527 | 9/1983 | Mohl et al. | 74/851 |
| 4,677,880 | 6/1987 | Hattori et al. | 74/866 |
| 4,688,450 | 8/1987 | Hayashi et al. | 74/858 X |
| 4,770,064 | 9/1988 | Kuerschner | 74/858 |
| 4,843,914 | 7/1989 | Koike | 74/858 |
| 4,933,851 | 6/1990 | Ito et al. | 74/858 X |

FOREIGN PATENT DOCUMENTS 63-14171 3/1988 Japan .

Primary Examiner—Dwight Diehl
Attorney, Agent, or Firm—Fleit, Jacobson, Cohn, Price, Holman & Stern

[57] ABSTRACT

An engine control system for a vehicle provided with an automatic transmission including an engine output control device for reducing an engine output in response to a shift operation of the automatic transmission, brake switch for detecting a braking operation of the vehicle, a restricting element for restricting the engine output control device from reducing the engine output when the braking operation is detected during the shift operation. The engine output is not reduced when the braking operation occurs even under the shift operation so that an undue drop of engine speed can be avoided. The engine speed can be smoothly increased after the braking operation responsive to acceleration operation to thereby improve the controllability.

11 Claims, 5 Drawing Sheets

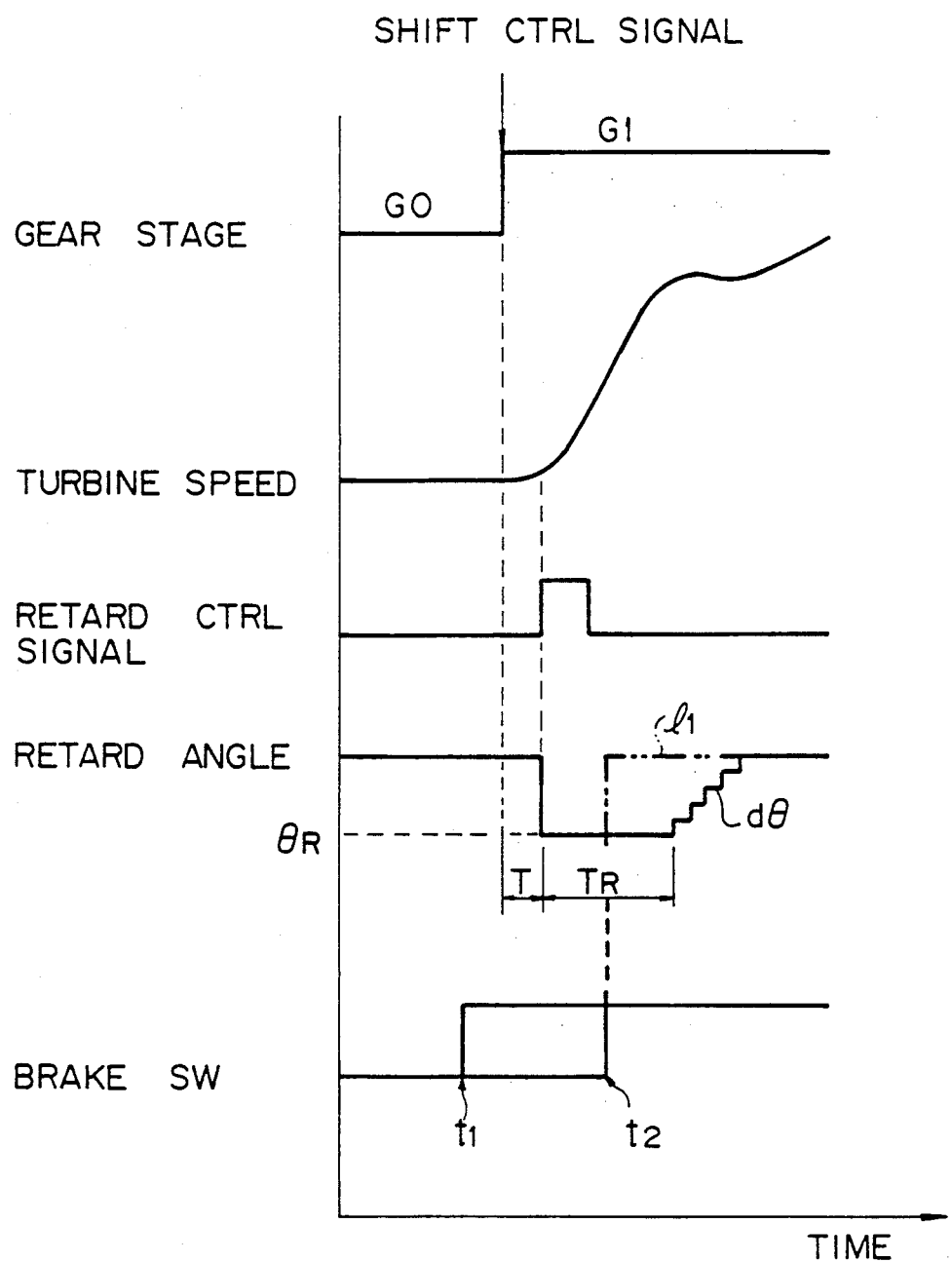

4,993,283

ENGINE CONTROL SYSTEM FOR VEHICLE WITH AUTOMATIC

BACKGROUND OF THE INVENTION

1. Field of the invention

The present invention relates to a control system for an internal combustion engine of a vehicle with an automatic transmission, more specifically to an output control of the engine in connection with a shift operation in the automatic transmission.

2. Description of the prior art

In a vehicle provided with an automatic transmission, there have been various proposals for reducing a torque shock or jolt through a shift operation from one gear stage to another in the automatic transmission. In a control system disclosed in U.S. Pat. No. 4,226,447, an ignition timing of the engine is controlled in accordance with a vehicle speed as a shift operation occurs so that an engine output power or torque is changed to reduce the torque shock due to the shift operation. U.S. Pat. Nos. 4,355,550, 4,370,903 and 4,403,527 disclose similar control systems.

In controlling the engine output during the shift operation, it should be noted that a time period from a generation of a control signal for the shift operation to a completion of the shift operation varies depending on a vehicle operating condition such as engine speed, an engine load defined by such as a throttle opening, intake gas amount and the like, line hydraulic pressure in the transmission, gear stages involved in the shift operation and the like.

In view of this, the conventional ignition timing output control is adapted to be initiated to control the engine output torque after a predetermined time period from the generation of the control signal for the shift operation.

It should however be noted that the engine speed may drop unduly in the case where a braking operation occurs before the shift operation is completed, since the engine output torque is controlled to be reduced during the shift operation. This may result in a deterioration of controllability of the vehicle.

SUMMARY OF THE INVENTION

It is therefore an object of the present invention to provide an engine control system which can accomplish an improved controllability of a vehicle with an automatic transmission.

It is another object of the present invention to provide an engine control system which can suppress a torque shock due to a shift operation of an automatic transmission.

It is still another object of the present invention to provide an engine control system which can prevent an undesirable engine speed reduction due to a braking operation during a shift operation.

The above and other objects of the present invention can be accomplished by an engine control system for a vehicle provided with an automatic transmission comprising engine output control means for reducing an engine output in response to a shift operation of the automatic transmission, brake detecting means for detecting a braking operation of the vehicle, restricting means for restricting the engine output control means from reducing the engine output when the braking operation is detected during the shift operation.

Preferably, the engine output control means is constituted by ignition timing control means for controlling an ignition timing of the engine. More specifically, the ignition timing control means retards the ignition timing in response to the shift operation.

According to the present invention, a retard control signal for retarding the ignition timing is produced after a predetermined time period from a generation of a shift control signal for effecting the shift operation.

Typically, a final ignition timing is calculated in accordance with a basic ignition timing which is determined based on an engine operating condition defined by such as engine speed, engine load, engine temperature and the like, a shift compensating value which is determined to reduce a torque shock due to the shift operation, and a knock compensating value which is determined to eliminate an engine knocking. The final ignition timing is compensated by a greater one of the shift compensating value and the knock compensating value.

According to the above ignition timing control, the retard control is not carried out in the case where the braking operation is made. However, the retard control is not necessarily be cancelled. The retard angle θATR can be reduced in response to the braking operation. The engine output is not reduced when the braking operation occurs even under the shift operation so that an undue drop of engine speed can be avoided. As a result, the engine speed can be smoothly increased after the braking operation responsive to acceleration operation to thereby improve the controllability.

The above and other features of the present invention will be apparent from the following description taking reference to the accompanying drawings.

BRIEF DESCRIPTION OF THE DRAWINGS

FIG. 5 is a graphical representation showing a time chart in the ignition timing control.

DESCRIPTION OF THE PREFERRED EMBODIMENT

Hereinafter there will be described preferred embodiments of the present invention taking reference with drawings.

Figure 1:
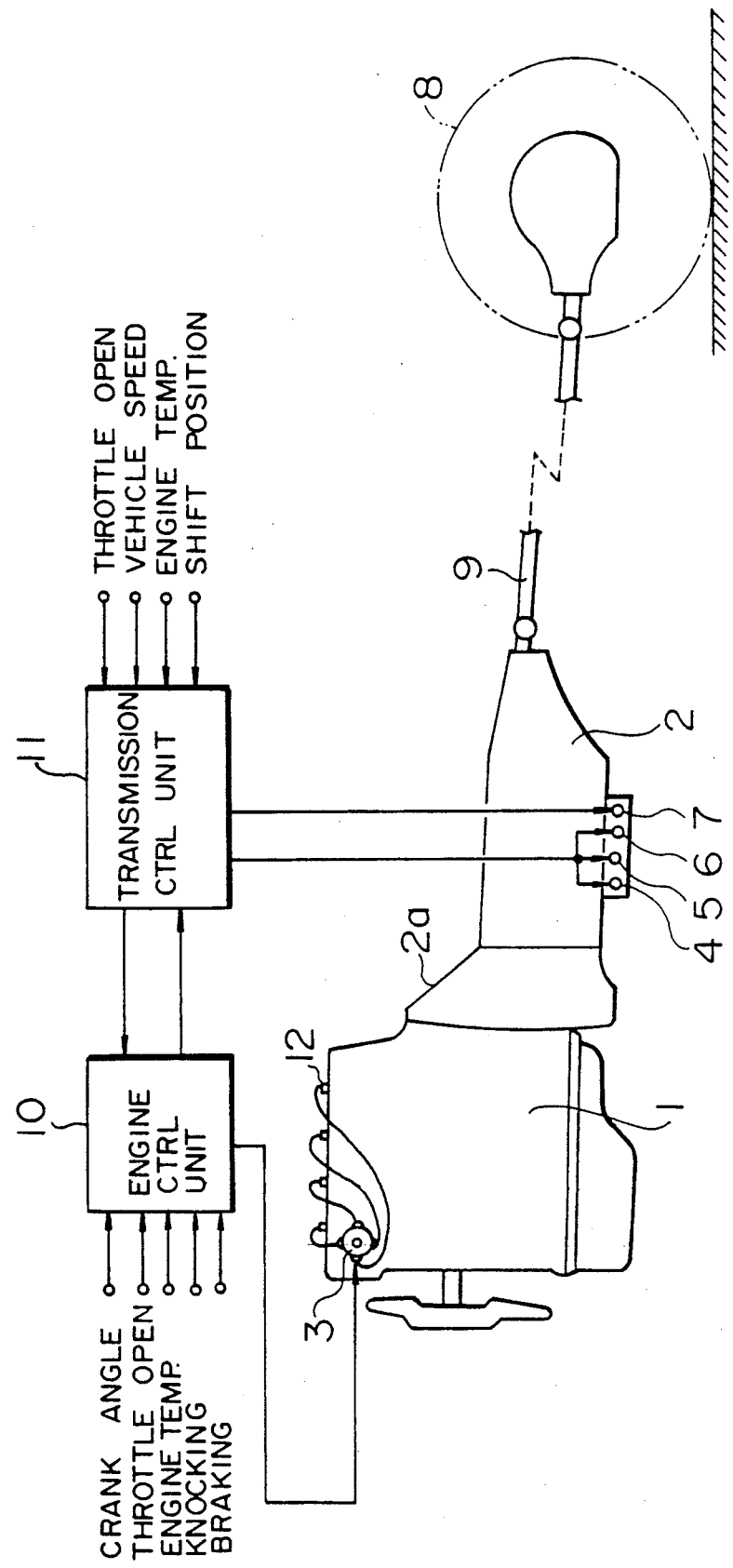
FIG. 1 is a schematic view of a power plant of a vehicle with an automatic transmission to which an engine control system in accordance with the present invention can be applied.

Referring specifically to FIG. 1, there is shown a schematic view of a power plant of a vehicle to which the present invention can be applied.

The power plant is provided with an engine 1 and an automatic transmission 2. The transmission 2 is connected with at one end with the engine 1 through a torque converter 2a. The transmission 2 is connected at the other end with a wheel 8 through a propeller shaft 9 so that an engine output power or torque is transmitted to the wheel 8 with a predetermined speed ratio. An igniter 3 is connected with respective four cylinders of the engine 1 for providing ignition plugs 12 with firing signals. The transmission 2 is provided with a shift gear mechanism therein for establishing a plurality of shift gear stages automatically in accordance with a vehicle operating condition defined by an engine speed, an engine load obtained through such as throttle opening, a gear stage, an acceleration of the vehicle and the like. For this purpose, the transmission 2 is provided with shift solenoid valves 4, 5 and 6 which are adapted to control a hydraulic pressure for operating fictional elements therein so as to switch a power transmitting path of the gear mechanism. The transmission 2 is also provided with a lock-up control solenoid valve 7 for controlling an engagement and disengagement of a lock-up clutch provided in the torque converter 2a.

In order to control operation of the engine 1, there is provided an engine control unit 10 constituted by a microcomputer.

The engine control unit 10 receives as control factors a crank angle, throttle valve opening, engine temperature, braking signal denoting braking operation of the vehicle, knocking signal denoting an engine knock and produces engine control signal such as an ignition signal. Likewise, in order to control operation of the transmission 2, there is provided with a transmission control unit 11. The transmission control unit 11 receives as control factors the throttle valve opening, vehicle speed, engine temperature, position of a shift lever showing a shift range currently selected, and the like. The transmission 2 controls the shift solenoid valves 4, 5 and 6 for carrying out a shift operation in which the gear stage of the shift gear mechanism is changed from one to another in accordance with a predetermined shift control map. General functions of the engine control unit 10 and the transmission control unit 11 are conventionally well known and they are not relevant to the features of the present invention so that the detailed explanation thereto are omitted.

A shift control signal from the transmission control unit 11 for controlling the shift solenoid valves 4, 5 and 6 is also supplied to the engine control unit 10. The engine control unit 10 receives the shift control signal and produces an ignition control signal for retarding an ignition timing in response to the shift operation so that the engine output torque is reduced during the shift operation of the transmission.

Hereinafter, there is described a retard control of an ignition timing in which the ignition timing is retarded in response to the shift operation.

Figure 2:
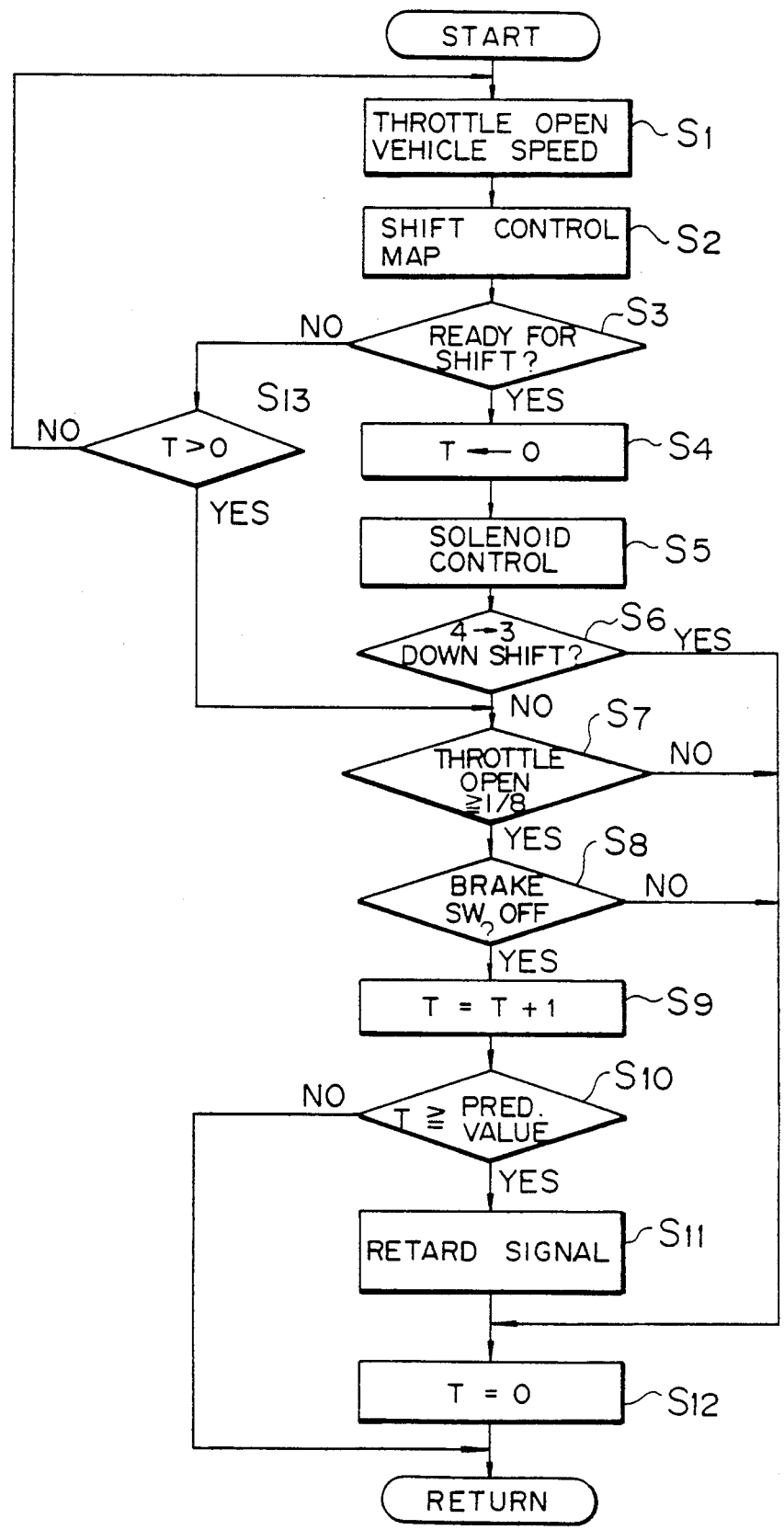
FIG. 2 is a flow chart of a shift control in a transmission control unit.

Referring to FIG. 2, a shift control of the transmission is shown. The transmission control unit 11 receives the throttle opening and the vehicle speed (S1). Then the transmission control unit 11 judges whether or not the shift operation is to be made in light of the shift control map stored in a memory thereof (S2 and S3).

If the judgment is Yes or the shift operation is to be made, the transmission control unit 11 sets a retard control counter T at a value zero (S4). The retard control counter T is provided for deferring an actual start of the retard ignition control by a predetermined time period after the shift control signal is generated. Therefore, the retard control of the ignition timing is initiated after the retard control counter T reaches a predetermined value. At the same time, the transmission control unit 11 produces the shift control signals to the shift control solenoid valves 4, 5 and 6 to carry out the shift operation (S5).

When the shift operation is to be a down shift from a fourth stage to a third stage, the retard control is not carried out because this down shift operation does not cause a serious torque shock inherently. When the throttle opening is less than one-eighth, the retard control is not carried out because it may cause an ignition fail. Further, when the braking operation is made (a brake switch is On), the retard control of the ignition timing is not carried out. For this purpose, judgments are made (S6, S7 and S8). In the case where the retard control is carried out, the transmission control unit 11 increases the value of the timer T (S9) until the value attains a predetermined value (S10). When the value of the timer T reaches the predetermined value, the transmission control unit 11 produces the retard control signal (S11). In step S12, the value of the timer T is reset.

Hereinafter, there is described the retard control by the engine control unit 10.

Figure 3:
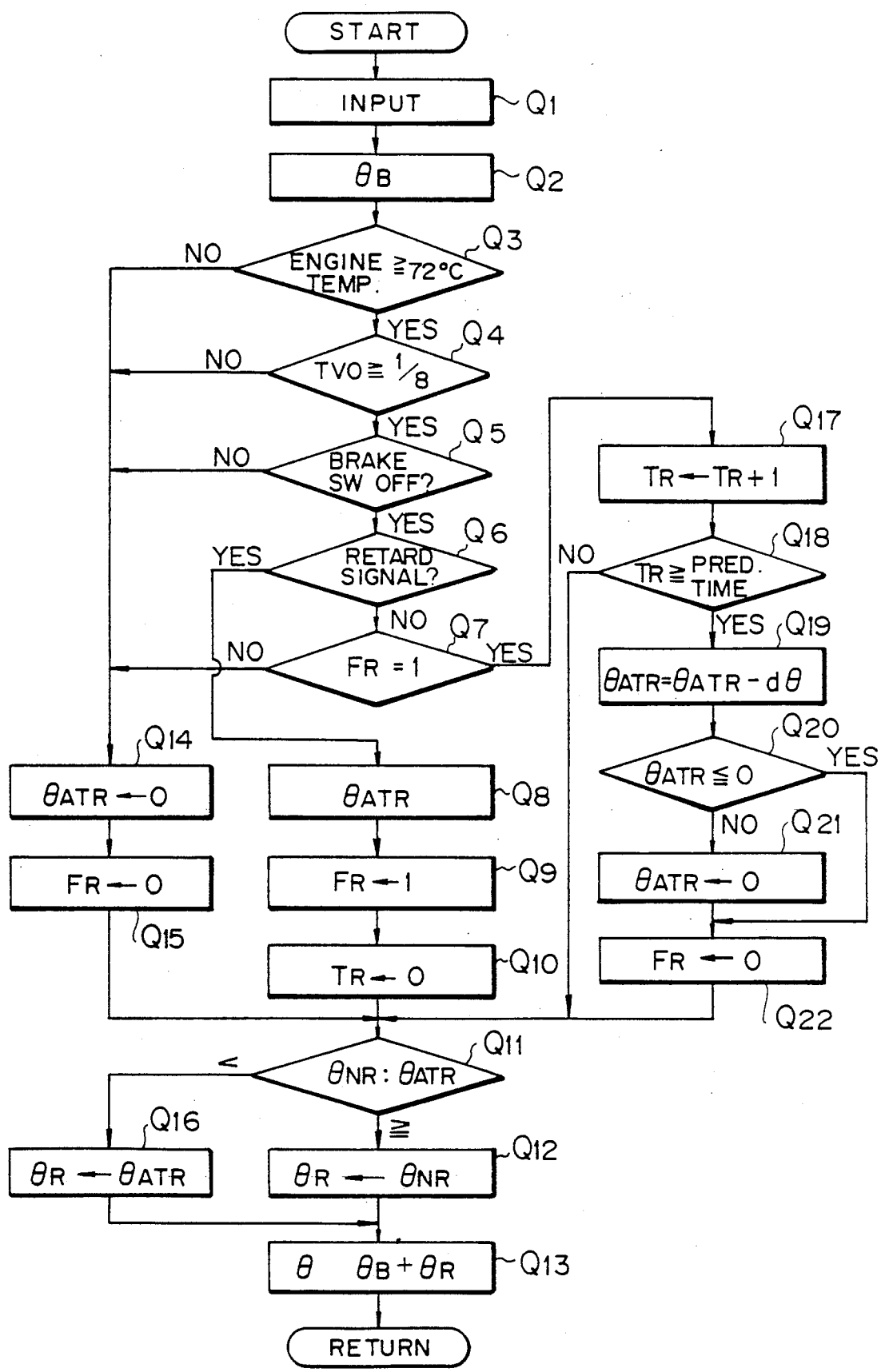
FIG. 3 is a flow chart of an ignition timing control in an engine control unit.

Referring to FIG. 3, the engine control unit 10 receives as control factors the engine speed, the engine load (throttle opening) and the engine temperature (engine coolant temperature)(Q1) and determines a basic ignition timing $\theta B$ (Q2).

According to the illustrated embodiment, a retard angle $\theta ATR$ in the ignition timing is determined (Q8) in light of a map (not shown) stored therein when the engine temperature is higher than a predetermined value (72 centigrade in this embodiment) (Q3), the throttle valve opening is greater than one-eighth (Q4), the braking operation is not detected (Q5) and the retard control signal is introduced from the transmission control unit 11 (Q6). In this case, a retard control flag FR is set at a value of 1 (Q9) and a retard period counter Tr is reset (Q10).

In step Q6, where the retard control flag FR is set at 1 even when the retard control signal is not introduced into the engine control unit 10 in the current processing cycle, it means that the retard control is now continued. Therefore, the retard period counter TR is increased (Q17) until it reaches a predetermined value (Q18).

On the other hand, where the retard control is not carried out, the retard angle $\theta ATR$ is set at zero (Q14) and the retard control flag FR is reset (Q15).

In step Q18, after the retard period counter TR reaches the predetermined value, the retard angle $\theta ATR$ is reduced by a value $d\theta$ in each processing cycle (Q19) unless the retard angle $\theta$ is reduced below zero (Q20). Finally, the retard angle $\theta ATR$ is set at zero. The retard control counter FR is reset (Q22).

After obtaining the retard angle $\theta ATR$ through the above procedure from step Q6 to Q22, the transmission control unit 11 determines a final ignition timing $\theta$ through steps Q11 to Q13.

In step Q11, the transmission control unit 11 compares the retard angle $\theta ATR$ with a knocking retard angle $\theta NR$ and uses a greater one as a final compensating angle $\theta R$ for the ignition timing $\theta$ (Q12, Q16). The final ignition timing $\theta$ is obtained by adding the final compensating angle $\theta R$ to the basic ignition timing $\theta B$ (Q13).

Figure 4:
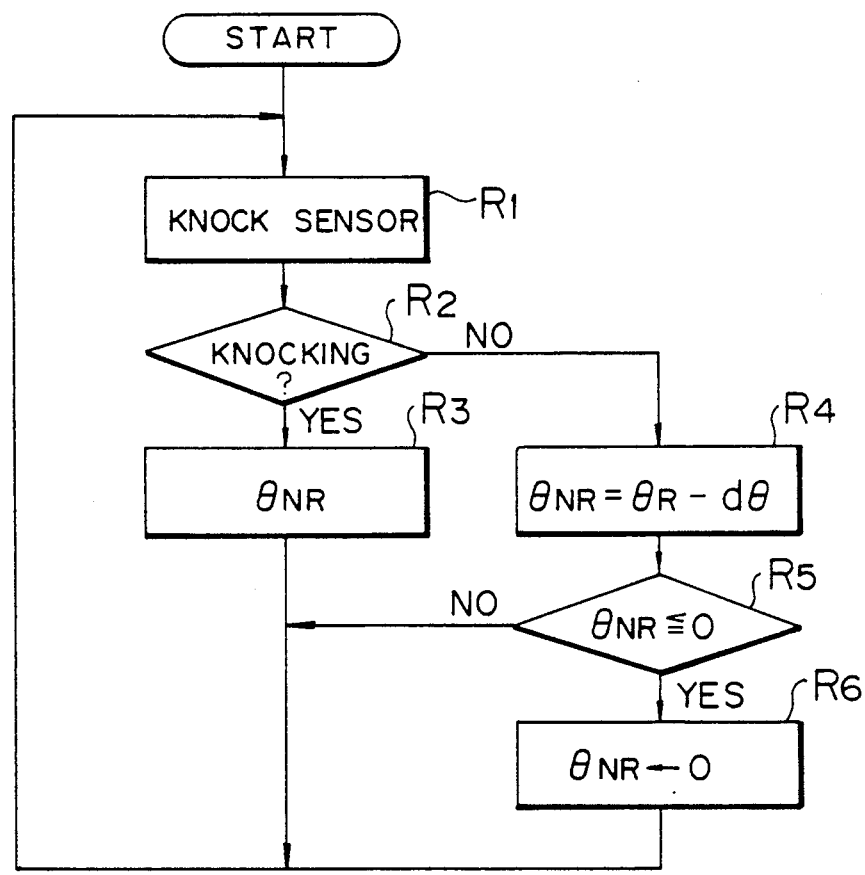
FIG. 4 is a flow chart of a procedure for obtaining a knocking retard angle in the engine control unit.

Referring to FIG. 4, there is shown a flow chart of a procedure for obtaining the knocking retard angle $\theta NR$ which is determined to suppress a knocking by controlling the ignition timing. The engine control unit 10 receives a signal from a knocking sensor (not shown) mounted on the engine 1 (R1). The knocking sensor is well known in the field of the present invention so that a detailed explanation thereto is omitted. For the purpose of the present invention, any kind of conventional knocking sensor can be employed. When the knocking is detected by the knocking sensor, the engine control unit 10 determines the knocking retard angle θNR in accordance with an intensity of the knocking (R3). On the other hand, when the knocking is not detected, the engine control unit 10 reduces the knocking retard angle θATR by the value dθ toward zero in each processing cycle (R2-R6).

Accordingly, when the shift operation is made from one gear stage G0 to another G1, the retard control signal is introduced from the transmission control unit 11 to the engine control unit 10 after the predetermined period T from the generation of the shift control signal to the solenoid valves 4, 5 and 6 as shown in FIG. 5. The retard control of the ignition timing continues for the predetermined time period TR with the constant value of the retard angle θR and thereafter the retard angle θATR is gradually reduced toward zero.

In this case, when the braking operation is made at a timing t1 at which the retard control signal is not introduced into the engine control unit 10, the retard control is cancelled. If the braking operation is made at a timing t2 at which the retard control is already initiated, the retard control is suspended immediately as shown in line 11 in FIG. 5.

According to the above ignition timing control, the retard control is not carried out in the case where the braking operation is made. However, this invention is not limited to this control but the retard angle θATR can be reduced in response to the braking operation.

It will be apparent from that many modifications and variations may be made based on the above descriptions by those skilled in the art without departing from the scope of the claims as attached.

What is claimed is:

1. An engine control system for a vehicle provided with an automatic transmission comprising
engine output control means for reducing an engine output in response to a shift operation of the automatic transmission,
brake detecting means for detecting a braking operation of the vehicle,
restricting means for restricting the engine output control means from reducing the engine output when the braking operation is detected during the shift operation.

2. An engine control system as recited in claim 1 wherein the engine output control means is constituted by ignition timing control means for controlling an ignition timing of the engine.

3. An engine control system as recited in claim 2 wherein the ignition timing control means carries out a retard control in which the ignition timing is retarded in response to the shift operation.

4. An engine control system as recited in claim 3 wherein a retard control signal for retarding the ignition timing is produced after a predetermined time period from a generation of a shift control signal for effecting the shift operation.

5. An engine control system as recited in claim 4 wherein when the braking operation is made at a timing at which the engine output control means is not actuated by the shift operation, the retard control is cancelled.

6. An engine control system as recited in claim 4 wherein when the braking operation is made at a timing after the engine output control means is actuated by the shift operation, the retard control is suspended immediately.

7. An engine control system as recited in claim 2 wherein a final ignition timing of the engine is calculated in accordance with a basic ignition timing which is determined based on an engine operating condition, a shift compensating value which is determined to reduce a torque shock due to the shift operation, and a knock compensating value which is determined to eliminate an engine knocking.

8. An engine control system as recited in claim 7 wherein the final ignition timing is compensated by a greater one of the shift compensating value and the knock compensating value.

9. An engine control system as recited in claim 1 further comprising switching means for switching a power transmitting path to change a shift gear stage from one to another in the automatic transmission, transmission control means for introducing a shift control signal to the switching means, engine output changing means for being actuated to change the engine output, engine control signal producing means for producing an engine control signal to the engine output changing means so as to change the engine output, said engine control signal producing means receiving the shift control signal from the transmission control means to change the engine output.

10. An engine control system as recited in claim 9 wherein said switching means comprises shift solenoid valves for switching a hydraulic path to establish a selected gear stage of the transmission, said engine output changing means comprising an igniter.

11. An engine control system as recited in claim 1 wherein the brake detecting means comprises a brake switch which produces On-Off signal in accordance with the braking operation.

* * * * *